Oct. 22, 1968
C. J. HELTZEL
3,406,839
MOBILE BATCHING PLANT
Filed Feb. 7, 1966
4 Sheets-Sheet 1
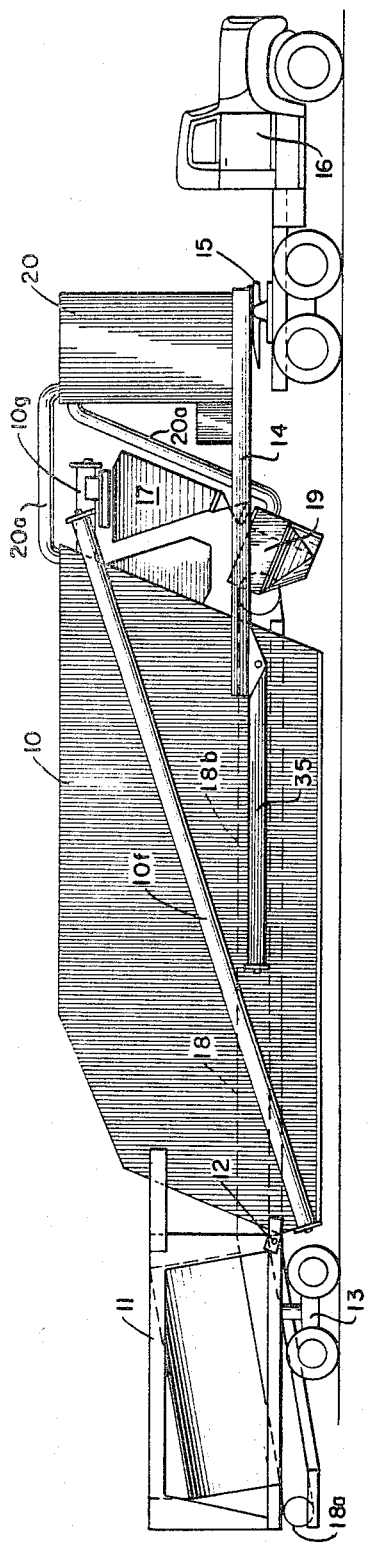
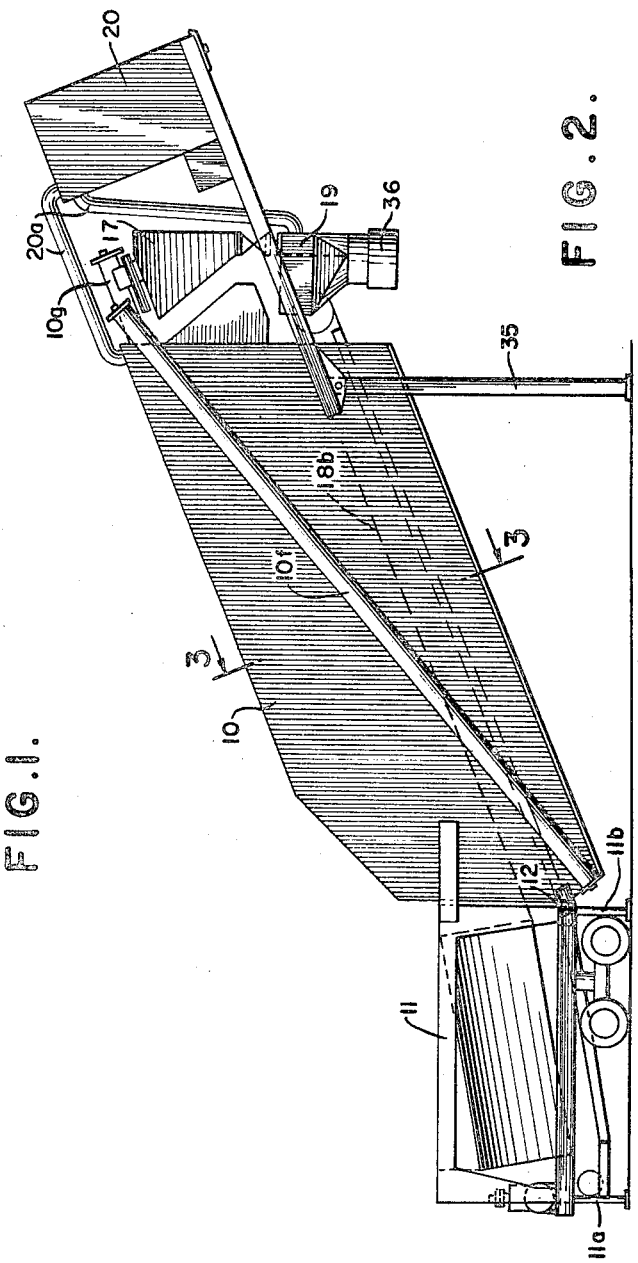
INVENTOR
Carl J. Heltzel
BY Wilkinson, Mawhinney & Theibault
ATTORNEYS

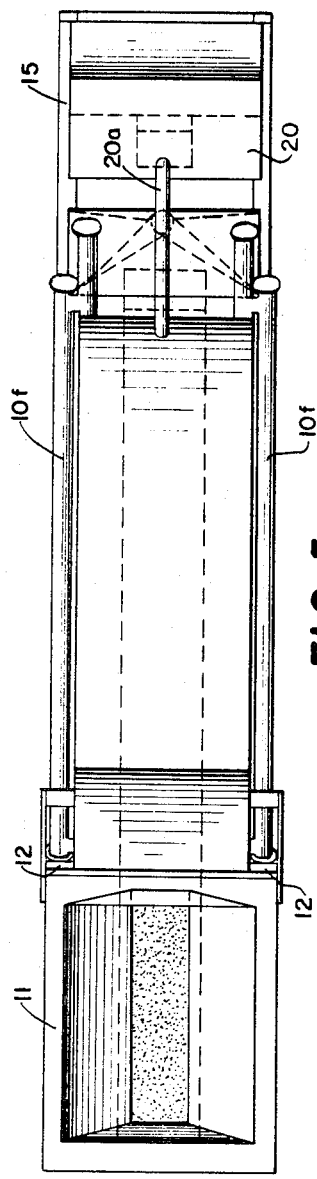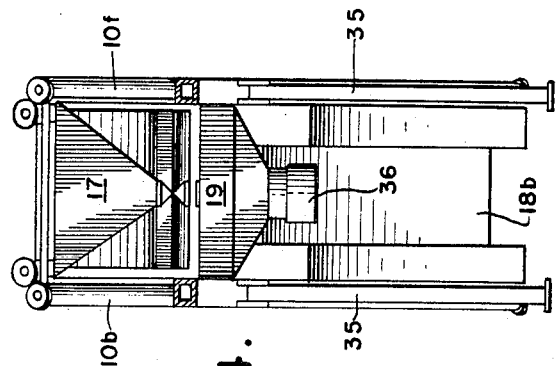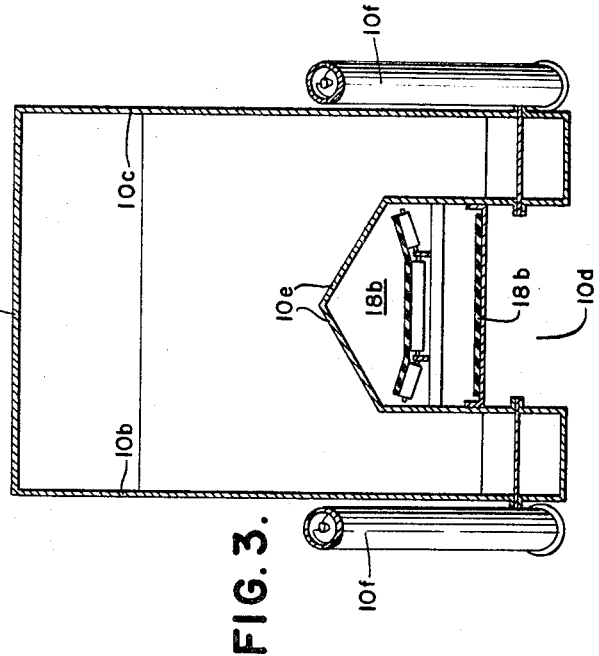

Oct. 22, 1968

C. J. HELTZEL 3,406,839

MOBILE BATCHING PLANT

Filed Feb. 7, 1966

INVENTOR
Carl J. Heltzel

BY Wilkinson, MawRinney & Theibault
ATTORNEYS

Oct. 22, 1968 C. J. HELTZEL 3,406,839
MOBILE BATCHING PLANT
Filed Feb. 7, 1966 4 Sheets-Sheet 4
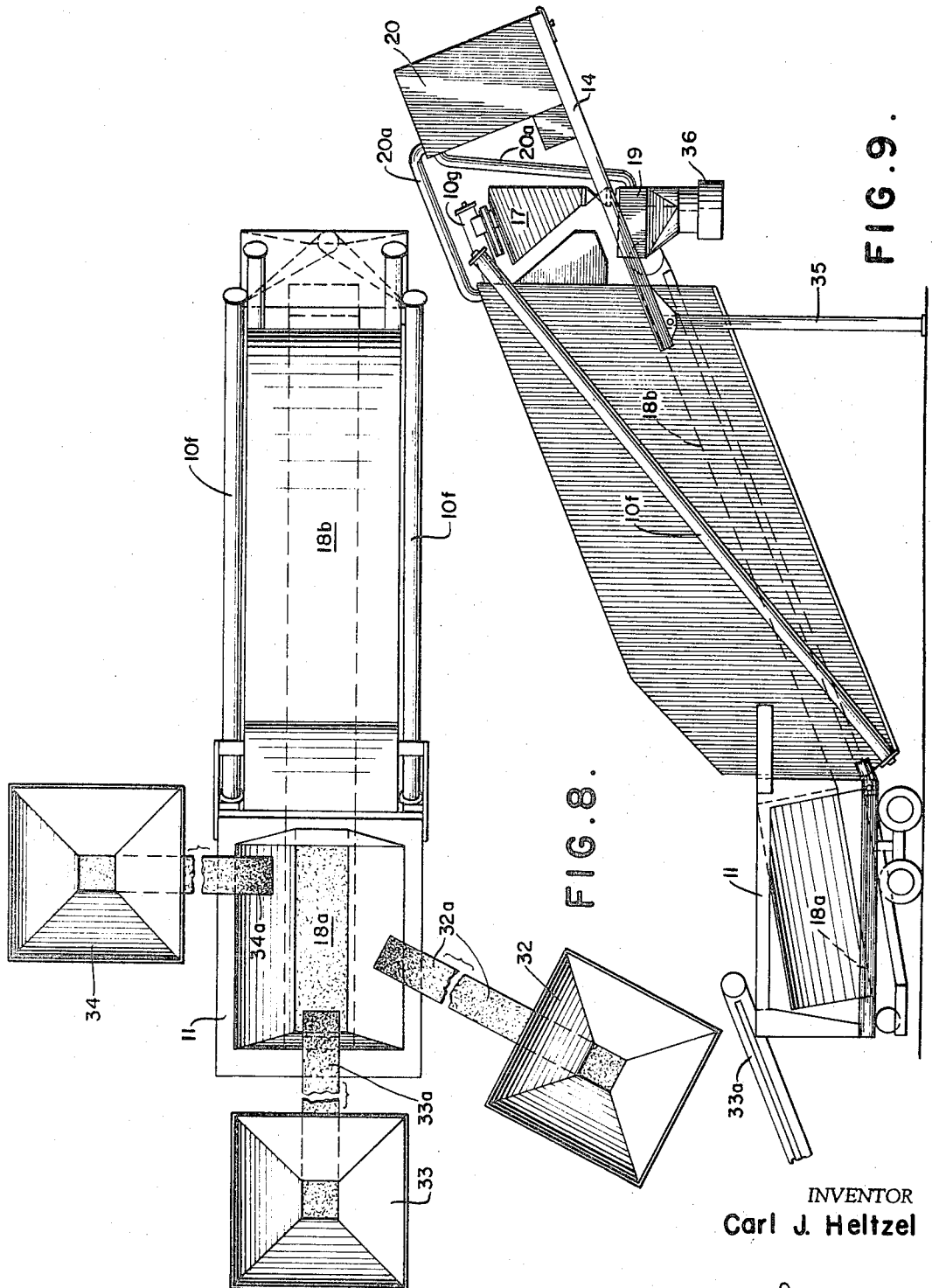
INVENTOR
Carl J. Heltzel
BY Wilkinson, Mawhinney & Theibault
ATTORNEYS

United States Patent Office 3,406,839
Patented Oct. 22, 1968

3,406,839
MOBILE BATCHING PLANT
Carl J. Heltzel, 523 Country Club Drive NE.,
Warren, Ohio 44484
Filed Feb. 7, 1966, Ser. No. 525,525
5 Claims. (Cl. 214—2)

The present invention relates to mobile batching plants and is an improvemnt over my prior Patent 3,154,202 and United States Letters Patent 3,064,832 in that the plant of the present invention provides a mobile batching plant having a large cement capacity and in which a plant of the present invention provides weather protection for aggregates carried by the conveyor from an aggregate batching hopper to an aggregate collecting hopper, and a unit which provides simpler basic construction for the over-the-highway transport of a high capacity cement bin, which bin cooperates with an aggregate batching hopper on a trailing truck to which the bin is pivoted and in which the bin is supported at its other end upon the fifth wheel of a motorized tractor unit by a draw bar mechanism rigidly secured to the cement bin.

Another object of the present invention is the provision of a batch plant simple in construction and having a high degree of flexibility of plant arrangement for job conditions.

A further object of the present invention is the provision of a mobile batching plant having a cement dust collector.

In both of the foregoing acknowledged patents the aggregate conveying mechanism was locked on the top of the cement bin and was exposed to elements which, during rain, would increase the moisture content of the mix making its exceptionally difficult to control the proper water-cement aggregate ratio. This has been eliminated by the tunnel effect in the cement bin forming a weather shield over the aggregate conveyor.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a side elevational view of the mobile batching plant constructed in accordance with the present invention, connected to a tractor for over-the-highway transport from one job site to another.

FIGURE 2 is a view similar to FIGURE 1 with the plant elevated to its operating condition and the tractor unit removed.

FIGURE 3 is a vertical section taken on the line 3—3 in FIGURE 2.

FIGURE 4 is a front elevational view with parts broken away and parts shown in section of the plant in the elevated condition of FIGURE 2.

FIGURE 5 is a top plan view of the plant of FIGURE 1.

FIGURE 8 is a top plan view of the batch plant of FIGURE 2 with a plurality of auxiliary aggregate charging units arranged about the aggregate batching unit of the mobile batching plant.

FIGURE 9 is a side elevational view of the plant arrangement of FIGURE 8.

Figure 7:
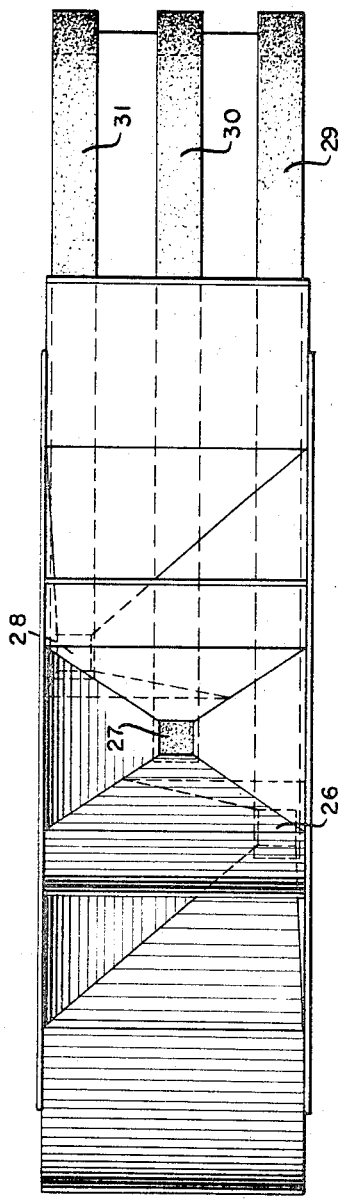
FIGURE 7 is a top plan view of the auxiliary aggregate charging vehicle of FIGURE 6.

Referring for the moment to FIGURES 1 and 2, the plant of the present invention comprises a large bulk cement storage unit 10 connected at its rear to an aggregate batching unit 11. The connection between the units 10 and 11 is a pivotal connection 12 which permits the cement storage unit 10 to be rocked vertically about the pivot 12 from the position of FIGURE 1 to that of FIGURE 2. The aggregate batching unit 11 is supported upon a rear truck 13 for over-the-highway transport.

Secured to the cement storage unit 10 and extending forwardly thereof is a draw bar unit 14 generally of U-shape construction, the upper ends of the U-shape being secured to the cement storage unit 10 as by welding or the like. The closed portion of the U-shaped draw bar unit 14 rests upon the fifth wheel 15 of a transport tractor unit 16.

Referring now to the cement storage unit 10, as shown in FIGURES 1 through 3, inclusive, the cement storage unit has a top $10^a$, side walls $10^b$ and $10^c$ and the bottom of the unit is cut out to define a conveyor way $10^d$ having a shed or roof portion $10^e$. Cement is delivered from the lowest portion of the plant in the elevated position of FIGURE 2 by two feed screws $10^f$ which connect at the top to a cement weighing hopper feed screw $10^g$. The screw feed arrangements shown herein are similar to the types illustrated and described in United States Patent 3,064,832. Positioned below the feed screw $10^g$ is a cement weighing hopper 17 carried by the cement bin and hung on the usual scale beam mechanism similar to that shown in United States Patent 3,064,832.

Carried beneath the aggregate batching unit 11 is an aggregate conveyor 18 of the endless belt type shown in United States Letters Patent 3,064,832, one portion $18^a$ of which passes beneath the aggregate batching unit and receives thereon aggregate for weighing, and the other portion $18^b$ of the conveyor passes through the tunnel defined by the portion $10^e$ of the cement storage unit 10. Positioned to receive the discharge from the upper portion of the conveyor leg $18^b$ is an aggregate collecting hopper 19 likewise connected through the usual scale beams and supports to the forward end of the cement storage unit 10.

Situated forwardly of the cement weighing hopper 17 and aggregate collecting hopper 19 is a dust collector 20 having dust line connections $20^a$ to both the cement storage bin 10 and the aggregate collecting hopper 19 to collect and substantially eliminate dust issuing forth from the operation of the mobile batch plant.

Figure 6:
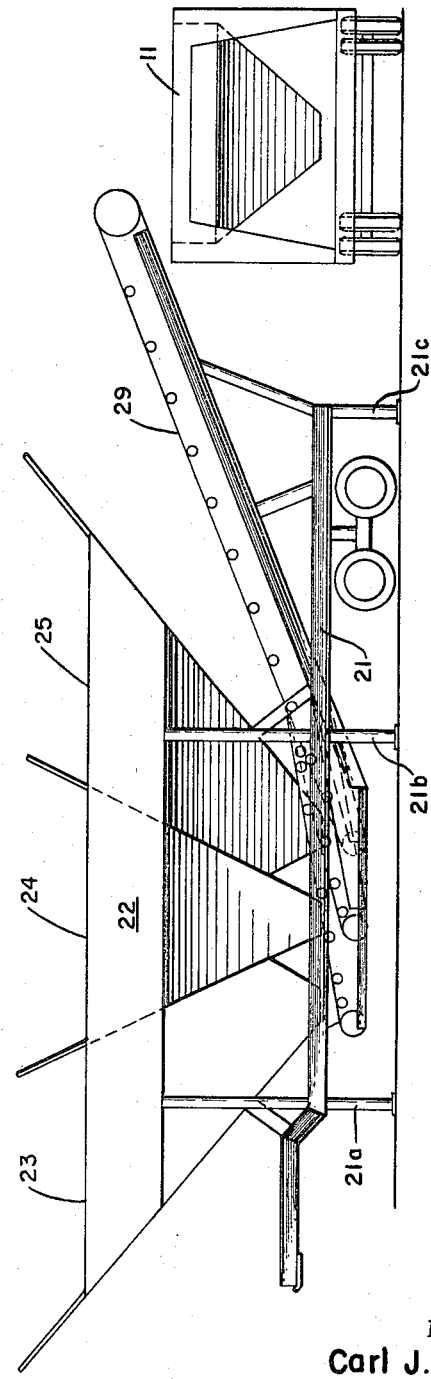
FIGURE 6 is a side elevational view with parts broken away and parts shown in section of an auxiliary aggregate charging vehicle for use with the mobile batch plant of FIGURE 2, showing same in its relative position for operation with the batch plant of FIGURE 2.

Referring now to FIGURES 6 and 7, 21 designates a mobile frame having wheels thereon for over-the-highway transport, which frame supports thereon a multi-compartmented aggregate storage hopper 22 having compartments 23, 24, 25 for receiving different types of aggregate; by way of example, sand in bin 23, crushed stone in bin 24 and gravel in bin 25. Each of the three aggregate bin compartments are provided with gates 26, 27 and 28 for discharging its respective type of aggregate onto conveyors 29, 30 and 31 respectively, which conveyors are of the endless belt type and which have a portion passing beneath the discharge gate of each bin and an upwardly inclined portion for elevating the aggregate for feeding onto the aggregate batching unit 11 of the mobile batch plant shown in FIGURES 1 and 2.

Referring now to FIGURES 8 and 9, an alternate plant arrangement can be provided where separate and independent aggregate bins 32, 33 and 34 are spotted about the aggregate batching unit 11 of the mobile batch plant and each aggregate hopper supplies the aggregate batching unit 11 with aggregate from its bin through an endless belt 32ª, 33ª and 34ª. The aggregate storage bin, whether it be in the form shown in FIGURES 6 and 7 or the form shown in FIGURES 8 and 9, is independently charged at the job site in any conventional manner such as a front end loader or bucket from a crane or drag.

In operation, when it is desired to employ the plant of the present invention, the draw bar mechanism 14 is connected to the fifth wheel 15 of an over-the-highway transport tractor 16 and the unit is moved to the job site, at which time the rear truck and aggregate batching unit is blocked up on jacks or pedestals 11ª and 11ᵇ. The draw bar means is disconnected from the tractor unit 16 and by a crane is elevated so that it pivots about the rear pivotal connection 12 between the cement storage unit 10 and aggregate batching feeding unit 11. Suitable props or supports 35 are placed beneath the front end of the cement storage unit 10 proximate the connection of the draw bar unit 14 to the same. Suitable water and electrical connections for the weighing system are established with the customer's service, and the scales in accordance with well-known practice are united and set for weighing.

The multiple aggregate storage hopper unit 22 is trucked into position so that the discharge of the conveyors 29, 30 and 31 will discharge aggregate into the aggregate batching unit 11. The unit is thereafter blocked in position by pedestals 21ª, 21ᵇ and 21ᶜ. Suitable electrical connections are established for the motors for driving endless conveyor belts 29, 30 and 31.

In accordance with well-known practice, a front end loader will charge each of the respective bins 23, 24 and 25 with the predetermined classified aggregate and sand to be placed therein and the unit is then ready to batch. The gates at the bottom of the bins 26, 27, 28 are then partially opened to permit aggregate to descend upon the respective conveyor belt and the aggregate is then conveyed by the belts and discharged into the aggregate batching unit 11 from whence it descends upon the portion 18ª of the aggregate conveyor traveling beneath the unit 11 and the aggregate will then ascend the leg of the conveyor belt 18ᵇ within the tunnel of the cement bin unit 10 to where it will be discharged into the aggregate collecting hopper 19.

In accordance with known practice, the belt drives of the aggregate conveyors will be under a load control system within the aggregate collecting hopper to stop overfeeding of the aggregate collecting hopper.

The cement feed screws 10ᵍ will then be driven in accordance with conventional practice by electrical motors to feed cement into the cement weighing hopper 17. When the correct amount of cement and aggregate have been supplied to the respective weighing hoppers the batch mix will be discharged through an opening 36 into a ready mix truck or dry mix truck or some vehicle for moving the batch from the plant onto the job site where the cement thus batched is to be used.

What is claimed is:

1. For use with an over-the-highway transport tractor unit, a cement and aggregate batching unit comprising:
   (a) an aggregate batching unit mounted on wheels for over-the-highway transport,
   (b) cement storage unit pivotally connected to said aggregate batching unit and adapted to be elevated at its forward end at the job site,
   (c) conveyor means carried by both said aggregate batching unit and cement storage unit and having a portion thereof extending beneath said aggregate batching unit and a portion passing beneath said cement storage unit,
   (d) cement weighing and aggregate collecting hoppers carried by said cement storage unit and being positioned to receive batch cement from said cement unit and aggregate from the conveyor means,
   (e) transport frame means secured to said cement storage unit and extending forwardly of said cement storage unit for connection in the lower position of said cement storage unit, to a tractor unit for transport from one site to another, and
   (f) a cement storage unit substantially rectangular in vertical cross-section having an aggregate conveyor tunnel through the bottom thereof, three of the four sides of which protect aggregate carried by conveyor from the elements.

2. An apparatus as claimed in claim 1 further comprising a dust collector carried by said transport frame means forwardly of said cement weighing hopper and aggregate collecting hopper and having a dust collector connection to said cement storage bin and to a truck discharge hopper.

3. For use with an over-the-highway transport tractor unit, a cement and aggregate batching unit comprising
   (a) an aggregate batching unit mounted on wheels for over-the-highway transport,
   (b) cement storage unit independently pivotally connected to said aggregate batching unit and adapted to be elevated at its forward end at the job site,
   (c) conveyor means carried by both said aggregate batching unit and cement storage unit and having a portion thereof extending beneath said aggregate batching unit and a portion passing beneath said cement storage unit,
   (d) cement weighing and aggregate collecting hoppers carried by said cement storage unit and being positioned to receive batch cement from said cement unit and aggregate from the conveyor means,
   (e) transport frame means secured to said cement storage unit and extending forwardly of said cement storage unit for connection in the lower position of said cement storage unit, to a tractor unit for transport from one site to another, and
   (f) an aggregate charging vehicle comprising a mobile frame adapted to be transported from one site to another by a tractor unit, plural aggregate bins carried by said mobile frame each having a discharge gate, and aggregate conveyor means carried by said mobile frame, one end of said conveyor means being in registry to receive aggregate from the discharge gates of said bins and the other end of said conveyor being elevated to discharge aggregate into said aggregate collecting and feeding unit at a job site.

4. For use with an over-the-highway transport tractor having a fifth wheel, a cement and aggregate batching unit comprising
   (a) a rear truck having an aggregate batching unit thereon,
   (b) a cement storage bin pivotally connected at its rear to said rear truck for elevating movement,
   (c) draw bar means secured at its rear to said cement storage bin at the forward end thereof and adapted to connect its front end to the fifth wheel of the tractor unit for suspending the cement storage bin between the rear truck and the transport tractor during transport from one site to another,
   (d) cement weighing hopper and aggregate collecting hopper carried by said cement storage bin at its end remote from its pivotal connection to said rear truck,
   (e) an aggregate conveyor means a portion of which is beneath said aggregate batching hopper and a portion of which passes beneath the cement bin to deliver aggregate to the aggregate collecting hopper, and (f) a dust collector carried by said draw bar means forwardly of said collecting hopper, said dust collector having a connection to both said cement storage bin and said collecting hopper.

5. An apparatus as claimed in claim 4 further comprising aggregate storage bins and conveyor means positioned to receive aggregate from said storage bin and to deliver same to the aggregate collecting hopper on said rear truck.

References Cited

UNITED STATES PATENTS

| 3,064,832 | 11/1962 | Heltzel | 214—17 |
| 3,251,484 | 5/1966 | Hagan | 214—2 |
| 3,295,698 | 1/1967 | Ross et al. | 214—2 |

GERALD M. FORLENZA, *Primary Examiner.*

F. E. WERNER, *Assistant Examiner.*